Nov. 29, 1932.  W. S. McCLINTOCK, JR  1,889,128
FREQUENCY METER
Filed Oct. 30, 1930  2 Sheets-Sheet 1

Inventor
William S. McClintock, Jr.
By Williams, Bradbury,
McCaleb & Hinkle
Attys.

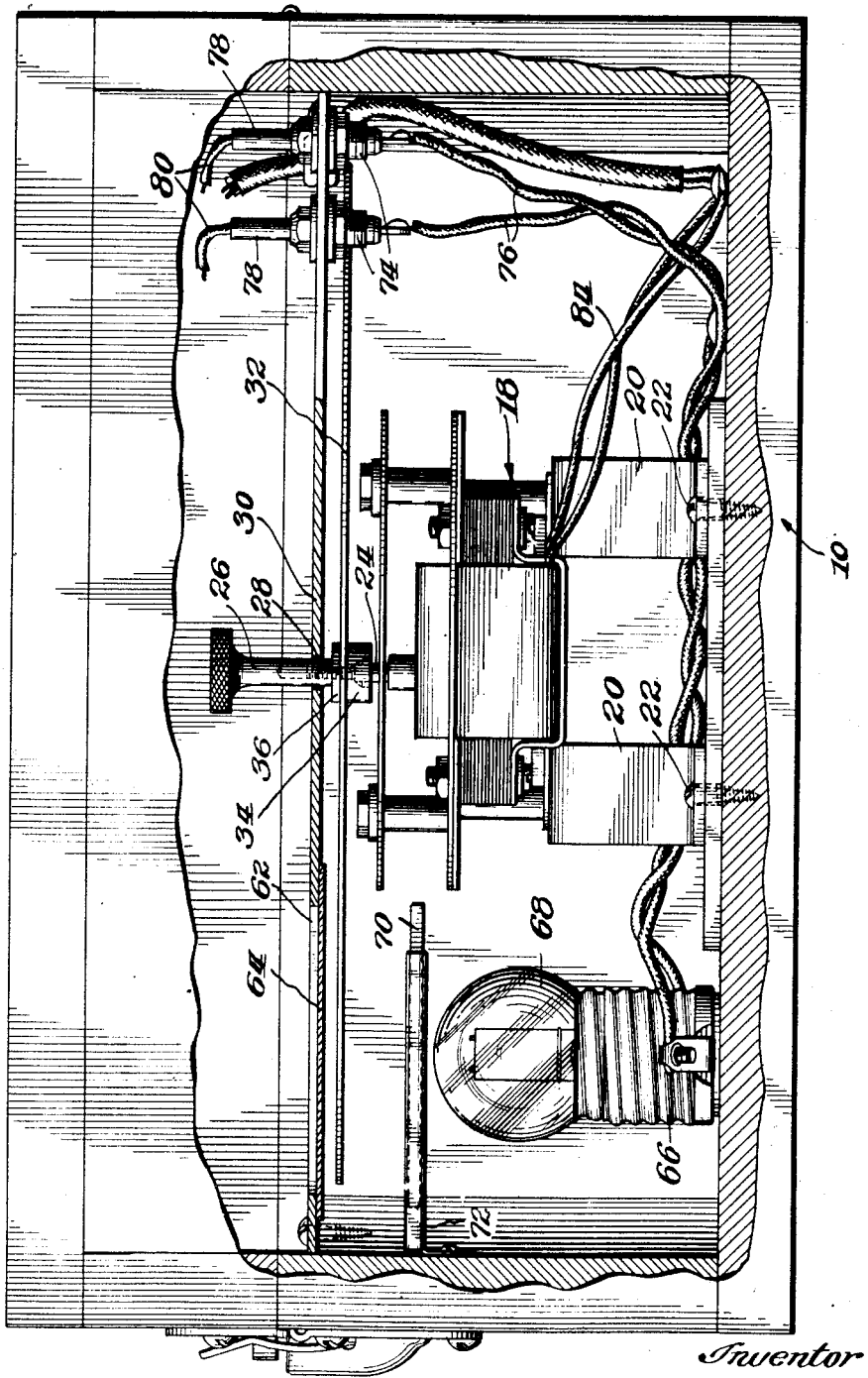

Patented Nov. 29, 1932

1,889,128

UNITED STATES PATENT OFFICE

WILLIAM S. McCLINTOCK, JR., OF CHICAGO, ILLINOIS

FREQUENCY METER

Application filed October 30, 1930. Serial No. 492,174.

My invention relates generally to frequency meters, and more particularly to apparatus for comparing the frequency of two separate sources of alternating current.

It is an object of my invention to provide an improved indicator of the frequency of alternating current in which an alternating current of standard frequency is used as a basis of comparison.

A further object is to provide a frequency meter which is simple in construction, may be economically manufactured, and which is capable of indicating the frequency throughout a comparatively wide range.

Other objects will appear from the following description, reference being had to the accompanying drawings, in which Figure 1 is a plan view of the meter with the cover swung to open position.

Figure 3 is a side elevation of the box for the instrument with the side thereof broken away to show the mechanism in elevation.

Figure 1:
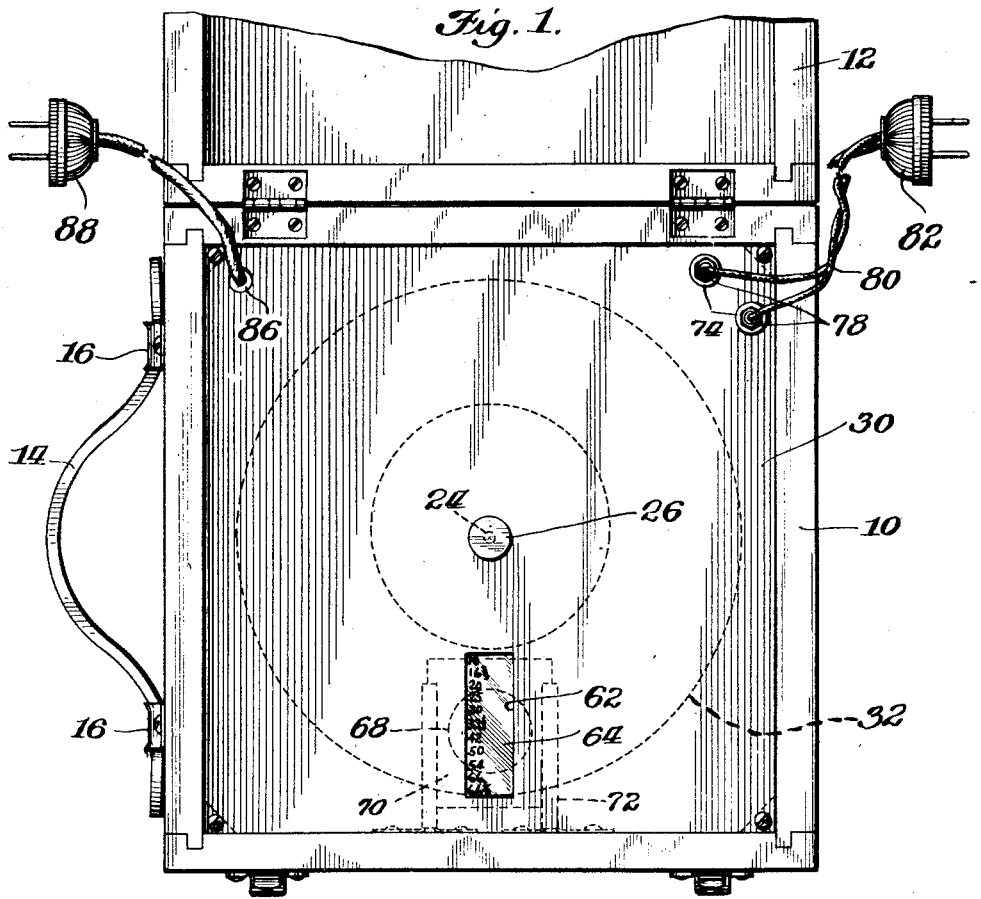
Figure 2:
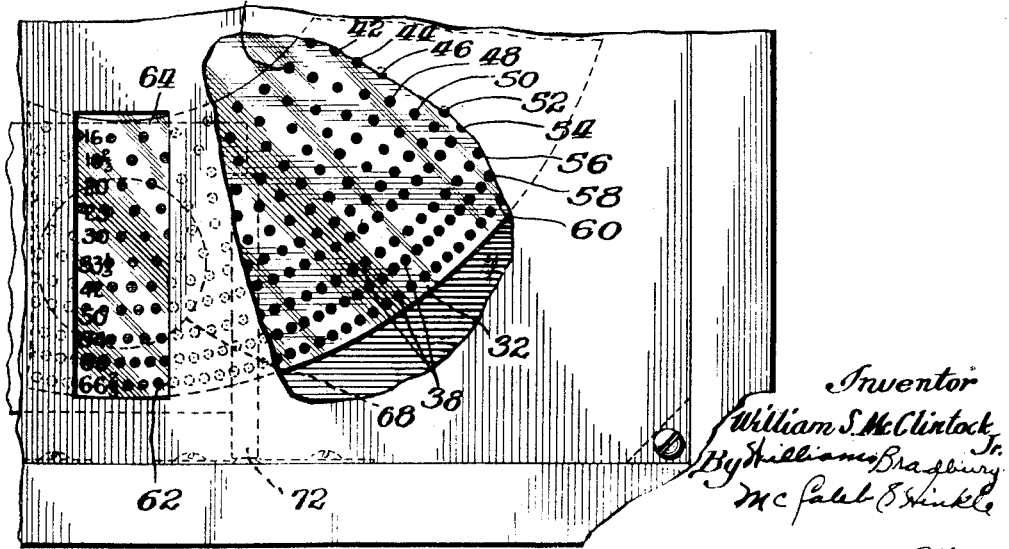
Figure 2 is an enlarged fragmentary plan view of the indicator, a portion of the top plate being broken away to show a portion of the indicator disc.

The frequency meter of my invention is preferably mounted in a suitable box 10 having a cover 12 hinged thereto. The box has a leather strap handle 14 suitably secured thereto by clips 16. A synchronous motor 18 is mounted on the bottom of the box, being supported by a pair of suitable brackets 20 which are attached to the bottom by screws 22. The synchronous motor may be of any well-known construction but is preferably of the type commonly used in frequency controlled electric clocks. One such type of motor is shown in the patent to Laurens Hammond, No. 1,719,805, granted July 2, 1929.

The motor 18 has a vertical shaft 24 which is connected to the rotor shaft of the motor by suitable gearing which will cause the shaft 24 to rotate at a speed of 40 R. P. M., or 2/3 of a revolution per second when the motor is supplied with 60 cycle current. The upper end of the shaft 24 is threaded to receive a knurled thumb screw 26 which extends through a suitable aperture 28 in top plate 30, and serves as means for securing a disc 32 to the shaft. The disc is clamped between a collar 34 fitting over the shaft 24 and a washer 36.

The disc 32 is preferably made of a transparent or translucent sheet of celluloid, a piece of sheet glass or other similar material. The disc 32 has a plurality of concentric rows of opaque dots 38 printed or otherwise marked thereon. These dots are located in rows concentric about the axis of the shaft 24 and the dots in each row are spaced equidistant from one another. In the embodiment illustrated, I have shown eleven concentric rows of dots, the inner row 40 having forty-eight dots; the next row 42 fifty dots; row 44 sixty dots; row 46 seventy-five dots; row 48 ninety dots; row 50 one hundred dots; row 52 one hundred and twenty-six dots; row 54 one hundred and fifty dots; row 56 one hundred and sixty-two dots; row 58 one hundred and ninety-eight dots; and row 60 two hundred dots.

The plate 30 is opaque, being preferably of sheet metal, and has a rectangular aperture 62 formed therein through which the rows of dots may be observed. The aperture 62 is preferably closed by a transparent strip 64 of celluloid or similar material which is glued or otherwise suitably secured to the bottom of the plate 30. This strip 64 preferably has the numbers corresponding to the frequencies to be measured etched or otherwise marked thereon. In the instrument shown, the rows of dots 38 on the disc 32 are spaced so as to give indications of frequencies of 16, 16⅔, 20, 25, 30, 33⅓, 42, 54, 66 and 66⅔ cycles per second, and these frequencies are therefore marked upon the strip 64. A socket 66 is suitably secured to the bottom of the box 10 beneath the aperture 62 and has a neon lamp 68 secured therein, the light from the lamp 68 being diffused by a screen 70 of frosted glass or similar material, which is supported on the end wall of the box 10 by a pair of brackets 72. The terminals of the socket 66 are connected to jacks 74 secured in the top plate 32 by a pair of conductors 76. The jacks are adapted to receive plugs 78 connected at the ends of wires 80, the other end of the wires 80 being connected to a suitable connection plug 82. Current is supplied to the synchronous motor 18 by conductors 84 which are led through an insulating eyelet 86 in the top plate 32 and at their ends are connected to a connection plug 88.

It is now generally the practice for practically all of the public utility companies supplying alternating current to regulate the frequency of the current supplied to its customers extremely accurately. In most power plants the regulation is of such high degree of accuracy that the frequency seldom varies from the standard nominal frequency by more than a fractional percent. Thus, by connecting the plug 88 with a commercial source of alternating current, the frequency of which is thus carefully regulated, the synchronous motor 18 will maintain a constant speed of rotation with the same degree of accuracy as the frequency of the current supplied. As previously stated, the synchronous motor is geared to the shaft 24 so that the latter will maintain a speed of 40 R. P. M. when the motor is supplied with 60 cycle current.

The connection plug 82 is connected to a source of alternating current, the frequency of which is to be measured or tested. It is a well-known characteristic of neon lamps that the degree of illumination thereof corresponds very closely to the voltage impressed, and that it is capable of very rapid fluctuations in degree of illumination. For practical purposes, the intensity of illumination furnished by the neon lamp may be considered to follow exactly the wave form of the impressed current. In practice, however, the lamp requires a certain voltage to cause the gas to become incandescent so that when an alternating current is supplied to the lamp, the lamp will be illuminated intermittently, twice during each cycle. I preferably employ a lamp which will be illuminated through a considerably wide voltage range so that it will be capable of illumination by current of a comparatively wide range of voltages. For instance, I have found a lamp which will be illuminated through a range from fifty to one hundred and fifty volts to be practical.

The particular synchronous motor 18 which I have utilized is not self-starting but may easily be started by twirling the knurled finger piece 26. Assuming that the synchronous motor is in operation, and a current having a frequency of sixteen cycles per second impressed upon the neon lamp 68, under these circumstances the innermost row of dots 40 will pass a given point in the sight aperture 62 at the rate of 32 per second. The lamp 68 will be illuminated 32 times per second so that the periods of illumination of the lamp will be synchronized exactly with the passage of the dots of the row 40. Due to the persistence of vision, the dots in the row 40 will thus appear to be substantially stationary, in accordance with the well-known stroboscopic effect. Since the remaining rows of dots are spaced at closer intervals, their movement across the sight aperture will not be synchronized with the illumination of the lamp and they will appear to be moving slowly or rapidly to the right or left, depending upon the ratios between their spacing and the frequency of the illuminations of the neon lamp.

If, for example, the frequency of the current supplied to the neon lamp 68 is 66⅔ cycles per second, the outer row 60 of the dots 32 will appear to be stationary while the remaining rows will appear to move to the right or the left more or less rapidly. When the dots of a given row appear to be moving slowly it is an indication that the frequency of the current supplied to the neon lamp is close to the frequency indicated by that particular row of dots. Assuming that the disc 32 rotates clockwise, slow apparent clockwise movement of the dots indicates that the frequency impressed upon the lamp is slightly greater than the frequency indicated by said row, whereas slow apparent counter-clockwise movement of a row of dots is an indication that the frequency impressed upon the lamp is slightly less than the frequency indicated by said row. The device may thus be used to interpolate frequencies which will fall between the indications corresponding to the rows of dots. Such interpolation may be very accurately estimated by gauging the speed at which the dots of the given row apparently move.

It will be understood that while I have shown a transparent disc having rows of opaque dots thereon, an opaque plate having perforations therein may be used in its place. Similarly, although I have shown the meter as capable of indicating given frequencies, the dots or perforations in the disc 32 may be suitably spaced to secure indication of practically any desired frequency. Likewise the speed of rotation of the disc may be varied to adapt the instrument for measurement of a desired frequency.

If desired, the neon lamp may be placed above the disc so as to illuminate it by reflection, in which case the disc may of course be opaque and have the dots painted, printed, or otherwise marked thereon in a color contrasting with that of the disc. Under certain circumstances it may be desirable to connect the neon lamp to a source of alternating current of known frequency and connect the synchronous motor to a source of current the frequency of which is to be determined. In the above description, the lamp 68 has been described as being a neon lamp, but it will of course be obvious that any other suitable source of illumination having the characteristics of a neon lamp in so far as variation of intensity of illumination with impressed voltage is concerned, may be used.

Other changes and modifications will become readily apparent to those skilled in the art, and I desire to include such modifications and variations within the scope of my invention.

I claim:

1. A portable frequency meter comprising a carrying case containing a neon lamp, a transparent sheet having a plurality of rows of alternate opaque and translucent portions, the said portions in each row being spaced equidistant and the spacing in each row differing from that of the other rows, a synchronous motor for moving said sheet at constant speed, means to connect said synchronous motor to a source of current of regulated frequency of known value, and means to connect said neon lamp to a source of current the frequency of which is to be determined.

2. In combination, a synchronous motor, a disc driven thereby, said disc having a plurality of concentric rows of equispaced alternately opaque and translucent portions, a neon lamp positioned at one side of said disc, a sight aperture through which a portion of the disc illuminated by said lamp may be observed, means for connecting said synchronous motor to a source of alternating current of regulated frequency of known value, and means to connect said neon lamp to a source of current the frequency of which is to be determined.

3. In a frequency meter, the combination of a synchronous motor adapted to be connected to a source of alternating current of regulated frequency of known value, a translucent disc driven by said synchronous motor, said disc having a plurality of concentric rows of opaque dots marked thereon, the dots in each row being spaced equidistant from one another and the spacing in each row differing from the spacing in the other rows, a neon lamp positioned at one side of said disc, an opaque plate covering said disc, said plate having an aperture therein overlying the portion of said disc illuminated by said lamp, a transparent strip having frequency indications marked thereon secured over said aperture, and means for supplying current the frequency of which is to be determined to said neon lamp.

4. In a frequency meter, the combination of a synchronous motor adapted to be connected to a source of alternating current of regulated frequency of known value, a translucent disc driven by said synchronous motor, said disc having a plurality of concentric rows of opaque dots marked thereon, the dots in each row being spaced equidistant from one another and the spacing in each row differing from the spacing in the other rows, a gas conduction lamp positioned at one side of said disc, a light diffusing screen positioned between said lamp and said disc, an opaque plate covering said disc, said plate having an aperture therein overlying said screen on the opposite side of said disc, a transparent strip having frequency indications marked thereon secured over said aperture, and means for supplying current the frequency of which is to be determined to said lamp.

5. A frequency meter comprising a gaseous conduction lamp, a member having a plurality of rows of spaced markings thereon, the markings of each row being spaced equidistantly and the spacing of the markings in each row differing from that of the other rows, a synchronous motor for moving said member past said lamp; and means to connect a source of alternating current of regulated known frequency and a source of alternating current of frequency to be determined, one to said lamp and one to said motor.

In witness whereof, I hereunto subscribe my name this 26th day of October, 1930.

WILLIAM S. McCLINTOCK, Jr.